United States Patent
Kagami et al.

(10) Patent No.: US 11,247,728 B2
(45) Date of Patent: Feb. 15, 2022

(54) VEHICLE BODY STRUCTURE

(71) Applicant: Toyota Jidosha Kabushiki Kaisha, Toyota (JP)

(72) Inventors: Ayaka Kagami, Inazawa (JP); Soshiro Murata, Nagoya (JP); Takashi Sagisaka, Miyoshi (JP); Takuji Okuda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 100 days.

(21) Appl. No.: 16/745,819

(22) Filed: Jan. 17, 2020

(65) Prior Publication Data
US 2020/0231223 A1 Jul. 23, 2020

(30) Foreign Application Priority Data
Jan. 22, 2019 (JP) .............................. JP2019-008770

(51) Int. Cl.
| | |
|---|---|
| *B62D 25/08* | (2006.01) |
| *B62D 21/15* | (2006.01) |
| *B62D 25/02* | (2006.01) |
| *B62D 27/02* | (2006.01) |
| *B62D 25/20* | (2006.01) |

(52) U.S. Cl.
CPC ........... *B62D 21/152* (2013.01); *B62D 25/02* (2013.01); *B62D 25/08* (2013.01); *B62D 25/2027* (2013.01); *B62D 27/023* (2013.01); *B62D 21/155* (2013.01); *B62D 25/2036* (2013.01)

(58) Field of Classification Search
CPC .... B62D 25/2027; B62D 25/08; B62D 25/20; B62D 27/023; B62D 21/155; B62D 21/152; B62D 21/157; B62D 29/008

USPC .......................................... 296/203.01, 4, 204
See application file for complete search history.

(56) References Cited

U.S. PATENT DOCUMENTS

| | | | | |
|---|---|---|---|---|
| 2011/0227367 A1* | 9/2011 | Funakoshi | ........... | B62D 25/087 296/187.11 |
| 2012/0181809 A1 | 7/2012 | Kuhl et al. | | |
| 2019/0111975 A1* | 4/2019 | Hata | ..................... | B32B 15/012 |

FOREIGN PATENT DOCUMENTS

| | | | | |
|---|---|---|---|---|
| CN | 103237713 | * | 8/2013 | ........... B62D 27/023 |
| JP | 2013-506588 A | | 2/2013 | |
| JP | 2017043158 A | * | 3/2017 | ........... B62D 21/152 |
| KR | 2013070364 A | * | 6/2013 | |

* cited by examiner

*Primary Examiner* — Dennis H Pedder
(74) *Attorney, Agent, or Firm* — Dinsmore & Shohl LLP

(57) ABSTRACT

A vehicle body structure including: a pair of left and right first vehicle body frame members manufactured by die casting, and are provided at vehicle transverse direction outer sides of a vehicle, and are provided so as to extend in a vehicle longitudinal direction; a pair of left and right second vehicle body frame members that are made of steel plates, and are joined to front end portions of the first vehicle body frame members from substantially vehicle transverse direction inner sides, and are provided so as to extend in the vehicle longitudinal direction; and projecting portions that are provided at the first vehicle body frame members at further toward a vehicle rear side than positions where the second vehicle body frame members are joined to the first vehicle body frame members, and that project-out toward a vehicle cabin inner side with respect to the first vehicle body frame members.

8 Claims, 10 Drawing Sheets

FIG.3
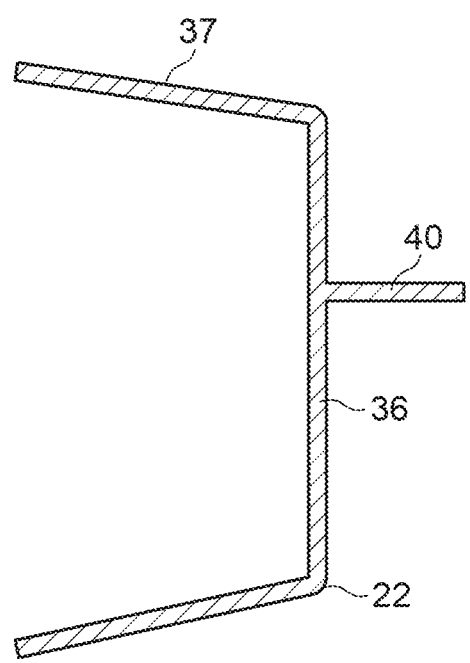
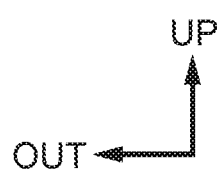

FIG.7
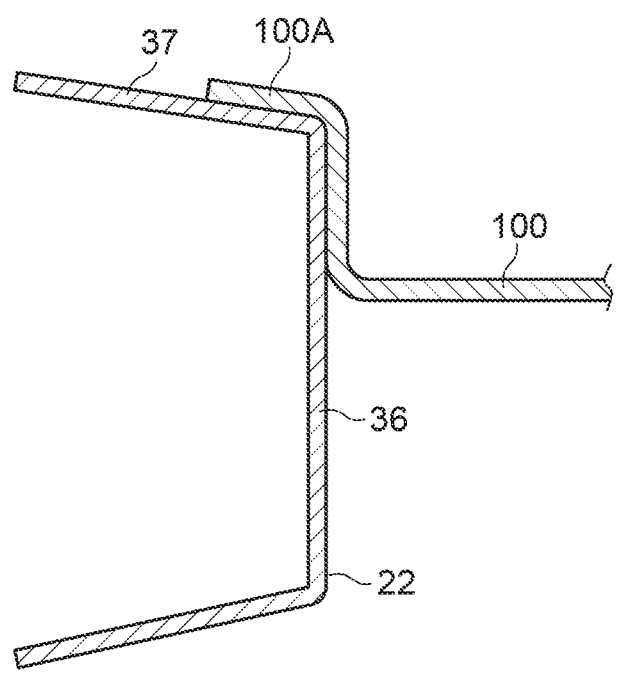
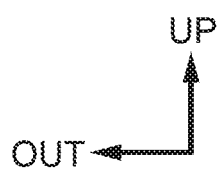

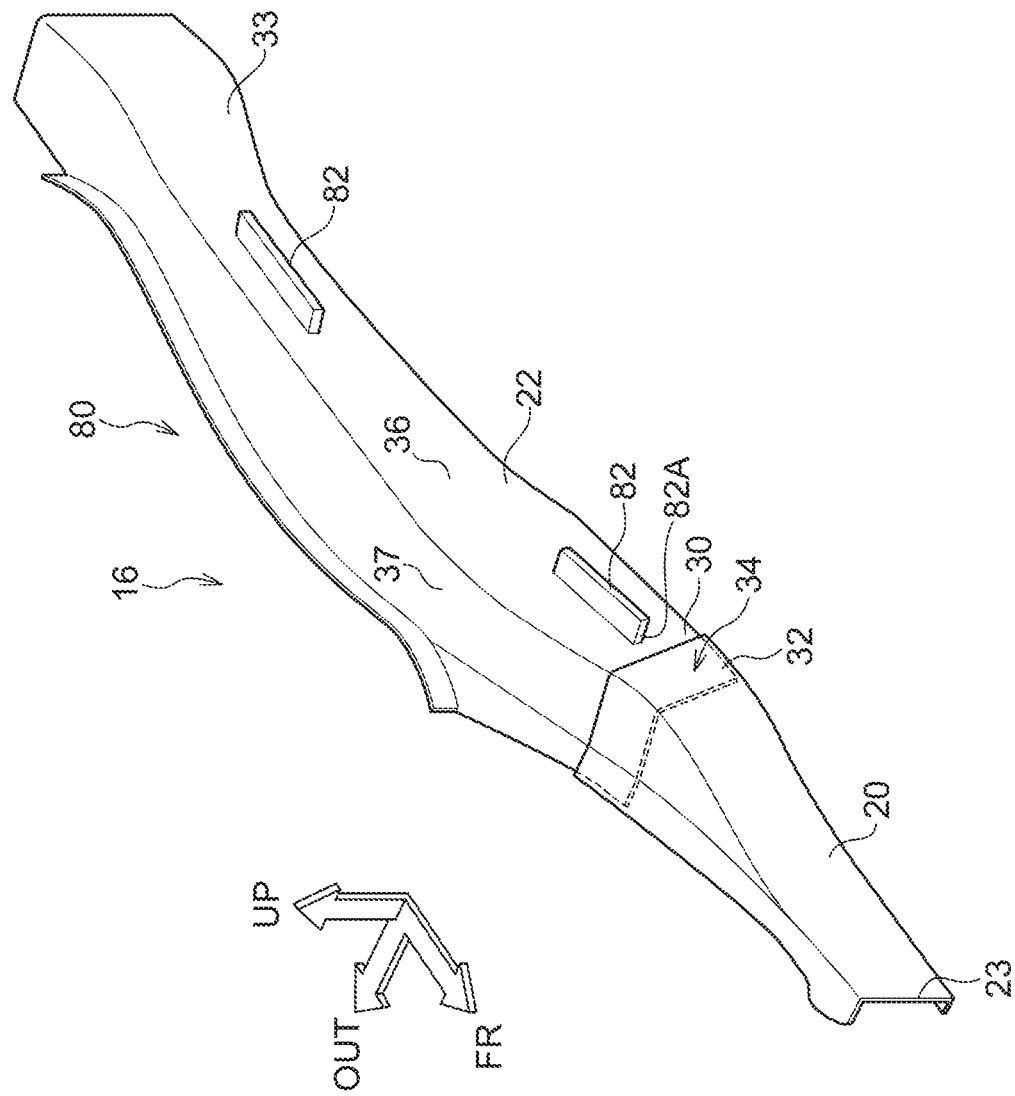

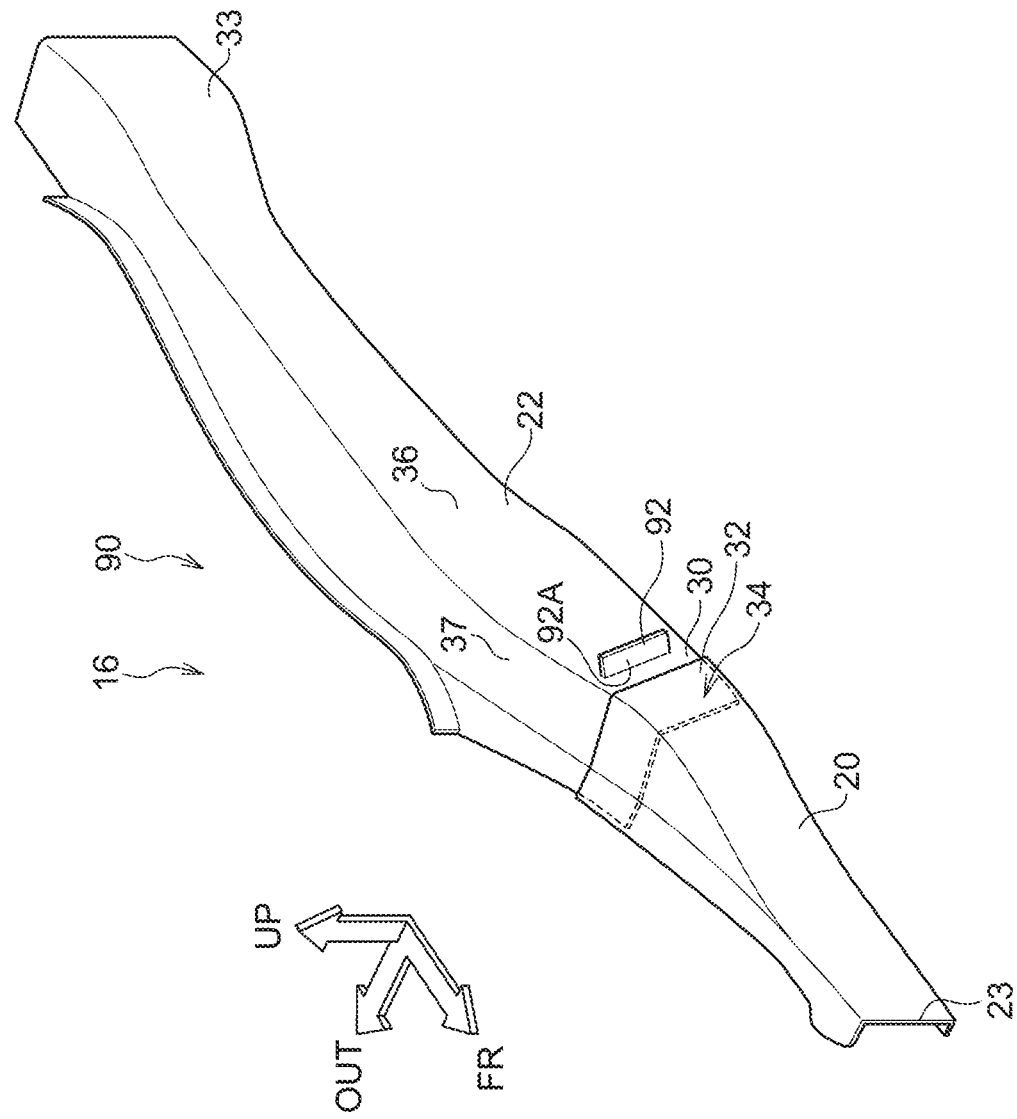

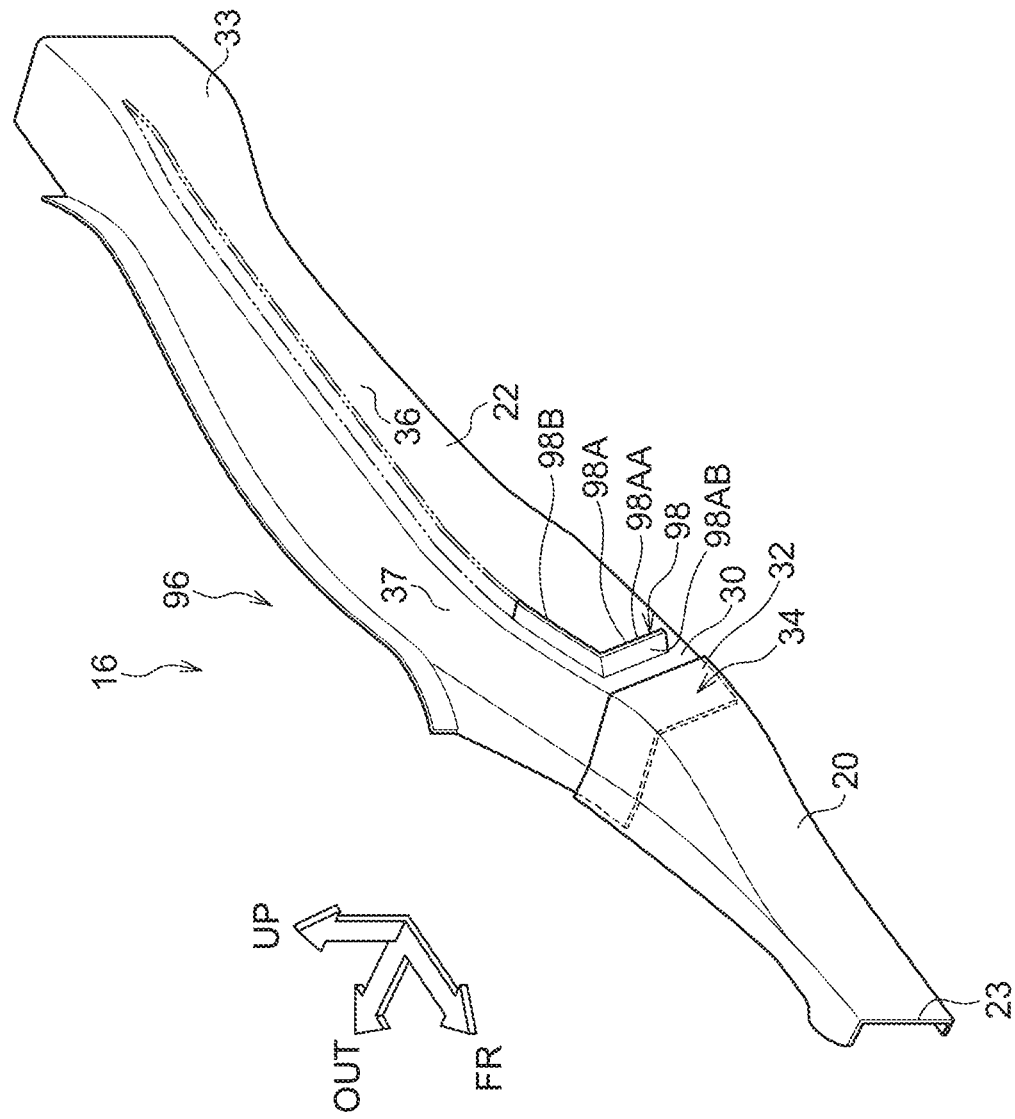

VEHICLE BODY STRUCTURE

CROSS-REFERENCE TO RELATED APPLICATION

This application claims priority under 35 USC 119 from Japanese Patent Application No. 2019-008770 filed on Jan. 22, 2019, the disclosure of which is incorporated by reference herein in its entirety.

BACKGROUND

Technical Field

The present disclosure relates to a vehicle body structure.

Related Art

A vehicle body structure is disclosed in Japanese Patent Application Laid-Open (JP-A) No. 2013-506588. This vehicle body structure has side members that are provided at the rear portion of a vehicle and the vehicle transverse direction outer sides, and that are provided so as to extend in the vehicle longitudinal direction. The side members are manufactured by aluminum die casting, and the bending rigidity of the vehicle body is improved thereby.

However, in a case in which the side members are formed by aluminum die casting as in the technique of JP-A No. 2013-506588, although the bending rigidity improves as compared with a case in which the side members are made of steel plates, the fragility increases. Accordingly, at the time of a side collision of the vehicle, and, in particular, in the case of a side collision in which the collision load concentrates at a portion of the vehicle such as in a so-called collision with a pole, there is the possibility that the side member will break and vehicle structures at the periphery (the fuel tank and the like) will be affected by the fragments. Therefore, it is preferable to form the regions, at which there is a high possibility of vehicle structures being affected in particular, of the side members from steel plates. However, if collision load is inputted to the joined portion of a region made by die casting and a region formed by a steel plate, there is the possibility that the joining will come undone, the region that is made of a steel plate will move greatly with respect to the region that is made by die casting, and the vehicle body will deform greatly on the whole. Accordingly, there is room for further improvement over the technique relating to JP-A No. 2013-506588 with regard to this point.

SUMMARY

The present disclosure provides a vehicle body structure that can suppress deformation of a vehicle body at the time of a vehicle collision.

A first aspect of the present disclosure is a vehicle body structure, comprising: a pair of left and right first vehicle body frame members that are manufactured by die casting, that are provided at vehicle transverse direction outer sides of a vehicle, and that extend in a vehicle longitudinal direction; a pair of left and right second vehicle body frame members that are made of steel plates, that are joined to front end portions of the first vehicle body frame members from substantially vehicle transverse direction inner sides, and that extend in the vehicle longitudinal direction; and projecting portions that are provided at the first vehicle body frame members further toward a vehicle rear side than positions at which the second vehicle body frame members are joined to the first vehicle body frame members, and that project toward a vehicle cabin inner side with respect to the first vehicle body frame members.

In accordance with the above-described first aspect, the vehicle body structure has the first vehicle body frame members, the second vehicle body frame members, and the projecting portions. The first vehicle body frame members are manufactured by die casting, and are provided as a left/right pair at the vehicle transverse direction outer sides of the vehicle, and are provided so as to extend in the vehicle longitudinal direction. The second vehicle body frame members are made of steel plates, are provided as a left/right pair at the vehicle transverse direction outer sides of the vehicle, are joined to the front end portions of the first vehicle body frame members from substantially vehicle transverse direction inner sides respectively, and are provided so as to extend in the vehicle longitudinal direction. The projecting portions are provided at the first vehicle body frame members at further toward the vehicle rear side than positions where the second vehicle body frame members are joined, and project-out toward the vehicle cabin inner side with respect to the first vehicle body frame members. Generally, when collision load is inputted to the first vehicle body frame member and the second vehicle body frame member at the time of a vehicle collision, and in particular, at the time of a vehicle rear collision (hereinafter simply called "rear collision") or at the time when a pillar-shaped object (a pole) collides with a vehicle side surface (hereinafter simply called "collision with a pole"), there are cases in which stress concentrates at the joined portion of the first vehicle body frame member and the second vehicle body frame member which is a border portion between different members, and the joining comes undone. Further, at the time of a rear collision, or depending on the position of abutting the pole at the time of a collision with a pole, the second vehicle body frame member deforms toward the vehicle transverse direction inner side with respect to the first vehicle body frame member, and the second vehicle body frame member starts to deform in a direction of relatively approaching the first vehicle body frame member. However, in this case, because the second vehicle body frame member abuts the projecting portion of the first vehicle body frame member, further relative movement can be suppressed.

A second aspect of the present disclosure is a vehicle body structure in which, in the above-described first aspect, the projecting portions are respectively formed substantially in a shape of a plate having a thickness direction substantially in a vehicle vertical direction.

In accordance with the above-described second aspect, because the projecting portion is formed substantially in the shape of a plate whose thickness direction is the substantially vehicle vertical direction, the second vehicle body frame member, which, at the time of a vehicle collision, becomes disjoined and moves relatively in a direction of approaching the first vehicle body frame member, abuts the front end surface of the projecting portion. Namely, because collision load is inputted to the projecting portion in a direction in which it is difficult for the projecting portion to bendingly deform, deformation of the projecting portion is suppressed, and relative movement of the first vehicle body frame member can be suppressed more.

A third aspect of the present disclosure is a vehicle body structure in which, in the above-described second aspect, the projecting portions extend substantially in a horizontal direction toward rear end portions of the first vehicle body frame members.

In accordance with the above-described third aspect, because the projecting portions are provided so as to extend substantially horizontally toward the rear end portions of the first vehicle body frame members, members such as the floor panel and the like that span between the pair of left and right first vehicle body frame members can be placed on the projecting portions. Namely, the joining at the time of providing the floor panel and the like is easy.

A fourth aspect of the present disclosure is a vehicle body structure in which, in the above-described second aspect, a plurality of the projecting portions separated from one another in the vehicle longitudinal direction, and the respective projecting portions are positioned substantially in the same plane as each other in a horizontal direction.

In accordance with the above-described fourth aspect, the plural projecting portions are provided so as to be apart from one another in the vehicle longitudinal direction, and the respective projecting portions are positioned in substantially the same plane in the horizontal direction. Therefore, members such as the floor panel and the like that span between the pair of left and right first vehicle body frame members can be placed on the projecting portions. Further, because other members can be disposed between the projecting portions that are apart from one another, the degrees of freedom in the layout increase.

A fifth aspect of the present disclosure is a vehicle body structure in which, in the above-described first aspect, the projecting portions are respectively formed substantially in a shape of a plate having a thickness direction substantially in the vehicle longitudinal direction.

In accordance with the above-described fifth aspect, the projecting portions are formed substantially in shapes of plates whose thickness directions are the substantially vehicle longitudinal direction. Therefore, the second vehicle body frame member, which, at the time of a vehicle collision, becomes disjoined and moves relatively in a direction of approaching the first vehicle body frame member, abuts the vehicle front side wall surface of the projecting portion. Namely, the surface area of abutment at the time when the second vehicle body frame member abuts the projecting portion can be made to be relatively large as compared with a case in which the second vehicle body frame member abuts the front end surface of the projecting portion, or the like. Therefore, the collision load can be dispersed efficiently.

A sixth aspect of the present disclosure is a vehicle body structure in which, in the above-described first aspect, the projecting portions comprise first projecting portions and second projecting portions, the first projecting portions are respectively formed substantially in a shape of a plate having a thickness direction substantially in the vehicle longitudinal direction, the second projecting portions are respectively formed substantially in a shape of a plate having a thickness direction substantially in a vehicle vertical direction, and the second projecting portions are joined to vehicle rear side wall surfaces of the first projecting portions.

In accordance with the above-described sixth aspect, second projecting portions are joined to the vehicle rear side wall surfaces of first projecting portions that are respectively formed substantially in the shape of a plate having thickness direction substantially in the vehicle longitudinal direction. The second projecting portions are respectively formed substantially in the shape of a plate having a thickness direction substantially in the vehicle vertical direction. Accordingly, the second vehicle body frame member, which, at the time of a vehicle collision, becomes disjoined and moves relatively in a direction of approaching the first vehicle body frame member, abuts the vehicle front side wall surface of the first projecting portions, which are respectively formed substantially in the shape of a plate having a thickness direction substantially in the vehicle longitudinal direction. Therefore, the surface area of abutment can be made relatively large, and therefore, the collision load can be dispersed efficiently. Further, the collision load that is input to the first projecting portions can be transmitted to the second projecting portions that are joined to the vehicle rear side wall surface. At the second projecting portions, the collision load is input in a direction in which it is difficult for the second projecting portions to bendingly deform, and therefore, the collision load can be absorbed more efficiently.

As described above, the vehicle body structure relating to the first aspect can suppress deformation of the vehicle body at the time of a vehicle collision.

The vehicle body structure relating to the second aspect can further suppress deformation of the vehicle body at the time of a vehicle collision.

The vehicle body structure relating to the third aspect can improve manufacturing efficiency.

The vehicle body structure relating to the fourth aspect can increase the degrees of freedom in design.

The vehicle body structure relating to the fifth aspect can further suppress deformation of the vehicle body at the time of a vehicle collision.

The vehicle body structure relating to the sixth aspect can even further suppress deformation of the vehicle body at the time of a vehicle collision.

BRIEF DESCRIPTION OF THE DRAWINGS

Exemplary embodiments of the present disclosure will be described in detail based on the following figures, wherein:

FIG. 3 is a cross-sectional view showing the state cut along line B-B in FIG. 3;

FIG. 7 is a cross-sectional view that corresponds to FIG. 6 and shows a comparative example;

FIG. 8 is a schematic perspective view showing a state in which the first vehicle body frame member and the second vehicle body frame member in a vehicle body structure relating to a third embodiment are seen from the vehicle cabin inner side;

FIG. 9 is a schematic perspective view showing a state in which the first vehicle body frame member and the second vehicle body frame member in a vehicle body structure relating to a fourth embodiment are seen from the vehicle cabin inner side; and FIG. 10 is a schematic perspective view showing a state in which the first vehicle body frame member and the second vehicle body frame member in a vehicle body structure relating to a fifth embodiment are seen from the vehicle cabin inner side.

DETAILED DESCRIPTION

First Embodiment

A vehicle body structure 10 of the present disclosure is described hereinafter on the basis of FIG. 1 through FIG. 4. Note that arrow FR, arrow UP and arrow OUT that are shown appropriately in the respective drawings indicate the forward direction (advancing direction), the upward direction, and an outer side in the vehicle transverse direction of the vehicle, respectively. Hereinafter, when description is given by merely using longitudinal, left-right and vertical directions, they refer to the longitudinal of the vehicle longitudinal direction, the left and the right of the vehicle left-right direction (the vehicle transverse direction), and the vertical of the vehicle vertical direction, unless otherwise indicated.

(Overall Structure)

Figure 4:
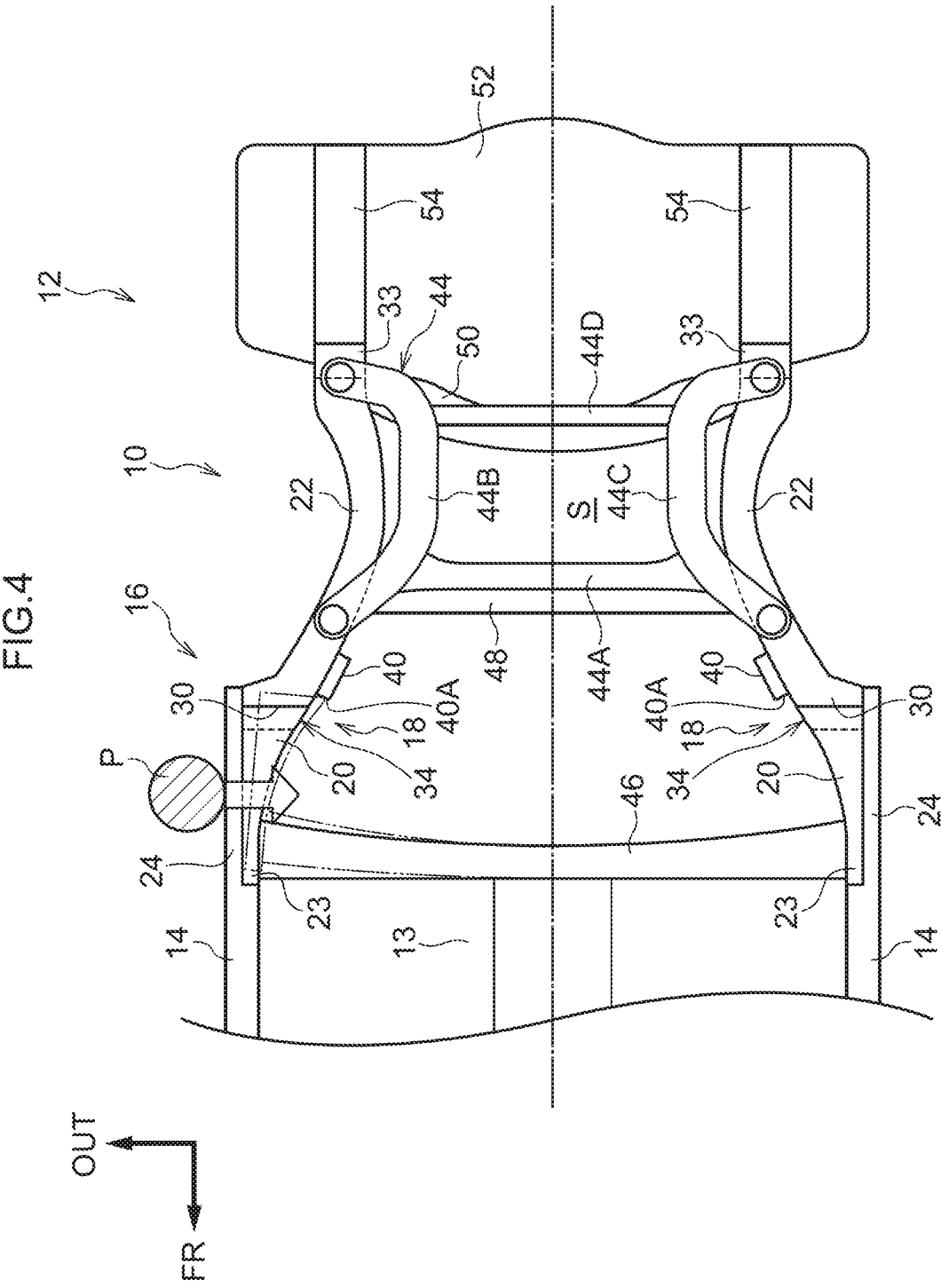
FIG. 4 is a bottom view showing a state in which a vehicle having the vehicle body structure relating to the first embodiment is seen from a vehicle lower side.

As shown in FIG. 4, rockers 14 that extend in the vehicle longitudinal direction are provided at the left and the right at the side portions of a vehicle 12. The cross-sectional shapes, which are cut along directions orthogonal to the length directions of the left and right rockers 14 (i.e., which are cut along the vehicle vertical direction and the vehicle transverse direction), of the rockers 14 are closed cross-sectional shapes. The rockers 14 respectively structure portions of the frame of a vehicle body 16.

A floor panel 13, which extends along the vehicle longitudinal direction and the vehicle transverse direction and structures the floor surface of the vehicle cabin interior (the cabin), is provided between the left and right rockers 14. The vehicle transverse direction both end portions of the floor panel 13 are joined to the left and right rockers 14, respectively.

(Rear Side Member)

Figure 1:
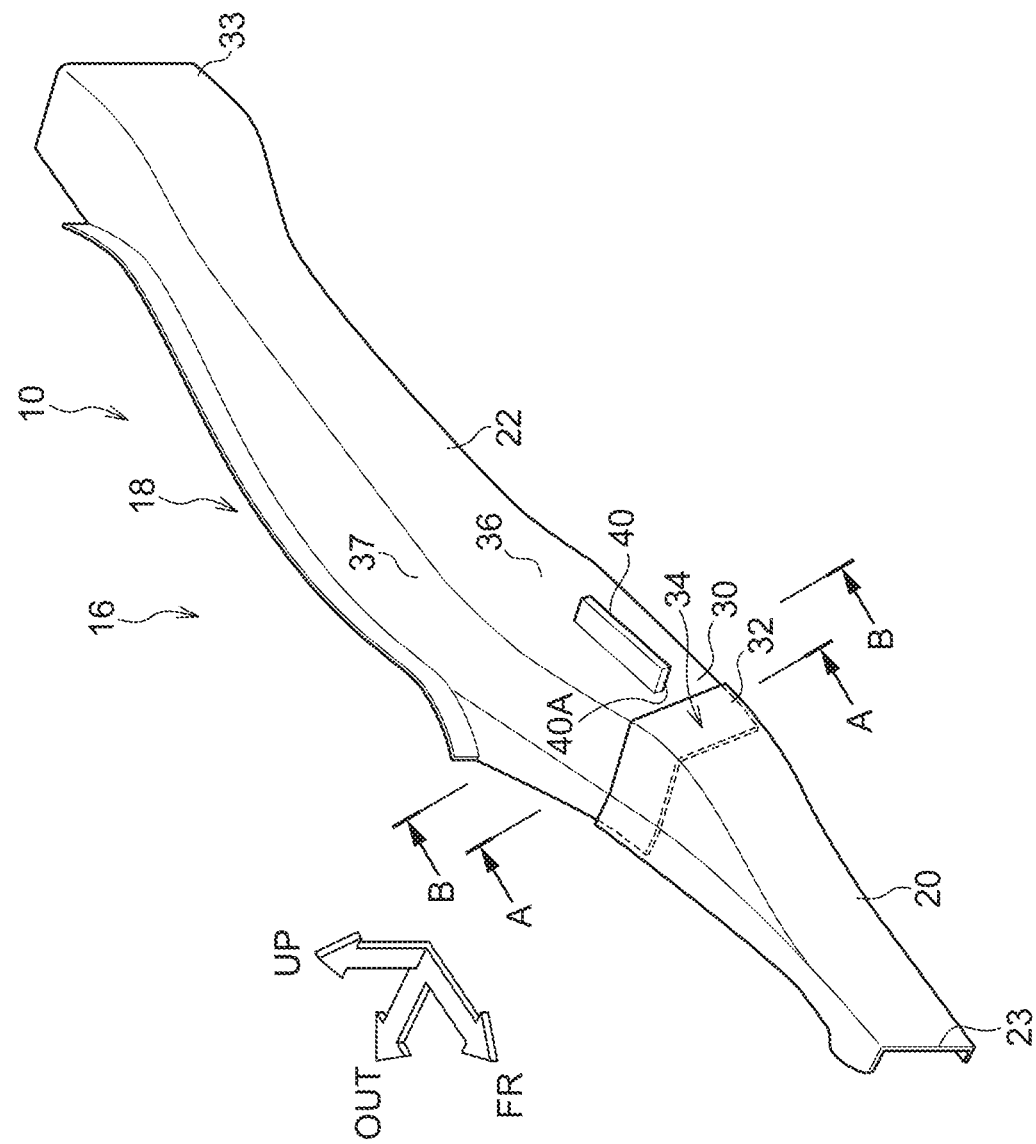
FIG. 1 is a schematic perspective view showing a state in which a first vehicle body frame member and a second vehicle body frame member in a vehicle body structure relating to a first embodiment are seen from a vehicle cabin inner side.

A pair of left and right rear side members 18 are provided at the vehicle rear sides and the vehicle transverse direction inner sides of the rockers 14, respectively. As shown in FIG. 1, the rear side member 18 is provided so as to extend in the vehicle longitudinal direction and toward the vehicle upper side while heading toward the vehicle rear side, and has a rear side member front portion 20 that serves as a second vehicle body frame member and structures the vehicle front portion, and a rear side member rear portion 22 that serves as a first vehicle body frame member and structures the vehicle rear portion.

(Rear Side Member Front Portion)

Figure 2:
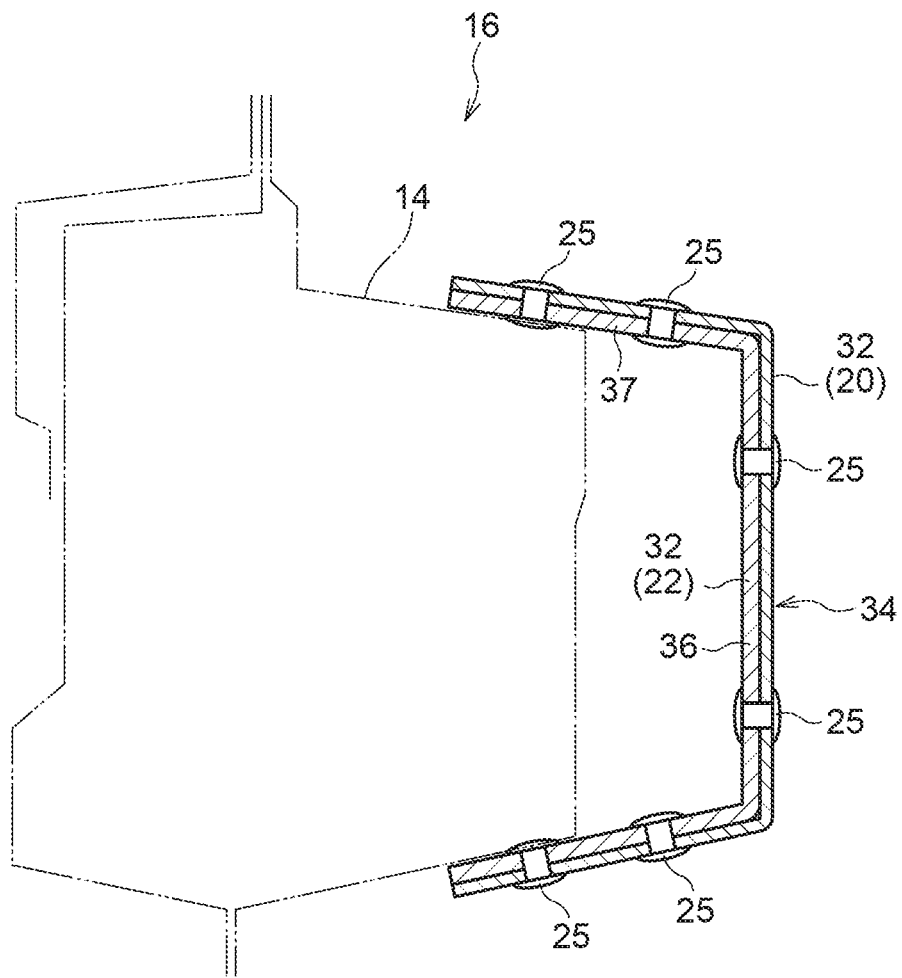
FIG. 2 is a cross-sectional view showing the state cut along line A-A in FIG. 1.

The rear side member front portion 20 is formed from a steel plate, and the cross-sectional shape thereof orthogonal to the length direction is formed in a substantial U-shape that opens toward the vehicle transverse direction outer side (see FIG. 2). A front end portion 23 of the rear side member front portion 20 is superposed, from the vehicle transverse direction inner side, on a rear end portion 24 of the rocker 14 (see FIG. 4) and is joined thereto by an unillustrated welded portion.

(Rear Side Member Rear Portion)

The rear side member rear portion 22 is manufactured by die casting, and, as shown in FIG. 2 and in the same way as the rear side member front portion 20, the cross-sectional shape thereof orthogonal to the length direction is formed in a substantial U-shape that opens toward the vehicle transverse direction outer side. A rear end portion 32 of the rear side member front portion 20 is superposed substantially from the vehicle transverse direction inner side onto a front end portion 30 of the rear side member rear portion 22, and is joined thereto by plural SPRs (self piercing rivets) 25. In other words, the region where the front end portion 30 of the rear side member rear portion 22 and the rear end portion 32 of the rear side member front portion 20 are joined corresponds to a joined portion 34.

As shown in FIG. 1, a projecting portion 40 is provided at the rear side member rear portion 22 at further toward the vehicle rear side than the joined portion 34. Concretely, the projecting portion 40 is provided at a vehicle transverse direction inner side wall portion 36 that is at the front end portion 30 side of the rear side member rear portion 22. The projecting portion 40 is formed substantially in the shape of a plate whose thickness direction is the substantially vehicle vertical direction and whose length direction is the substantially vehicle longitudinal direction. As shown in FIG. 3, the projecting portion 40 projects-out toward the vehicle transverse direction inner side (the vehicle cabin inner side) with respect to the vehicle transverse direction inner side wall portion 36. Namely, a front end surface 40A (see FIG. 1) of the projecting portion 40 is structured so as to face the rear end portion 32 of the rear side member front portion 20 in the vehicle longitudinal direction.

(Suspension Member)

As shown in FIG. 4, a rear suspension member 44 is provided at the vehicle lower sides of the rear side member rear portions 22. The rear suspension member 44 is formed so as to be shaped substantially as a rectangular frame that has a space S at the center thereof as seen from the vehicle lower side, by a front cross member 44A that extends in the vehicle transverse direction, a pair of left and right side rails 44B, 44C that extend toward the vehicle rear side from the vehicle transverse direction both end portions of the front cross member 44A, and a rear cross member 44D that connects the rear end portions of the pair of left and right side rails 44B, 44C. The rear suspension member 44 is supported in a state of hanging-down at the rear side member rear portions 22. A suspension that spans between the left and right rear tires, suspension arms, a stabilizer (none of which are illustrated) and the like are mounted to the rear suspension member 44.

(Center Cross Member)

The pair of left and right rear side member front portions 20 are connected in the vehicle transverse direction by a center cross member 46 that structures the frame of the vehicle body lower portion. As an example, the center cross member 46 is disposed at the vehicle lower side of the floor panel 13, and the cross-sectional shape thereof that is cut along the vehicle longitudinal direction is shaped as a hat that opens toward the floor panel 13 side. The center cross member 46 is joined by welding or the like to the lower surface of the floor panel 13. Due thereto, a closed cross-sectional structure is structured by the center cross member 46 and the floor panel 13.

(First Rear Cross Member)

A first rear cross member 48 is provided at the vehicle rear side of the center cross member 46. The first rear cross member 48 is disposed at the vehicle lower side of the floor panel 13 with the vehicle transverse direction being the length direction thereof. The both end portions in the length direction of the first rear cross member 48 are joined by welding or the like to the substantially central portions of the rear side member rear portions 22. As an example, the cross-sectional shape of the first rear cross member 48 that is cut along the vehicle longitudinal direction is shaped as a hat that opens toward the floor panel 13 side, and the first rear cross member 48 is joined by welding or the like to the lower surface of the floor panel 13. Due thereto, a closed cross-sectional structure is structured by the first rear cross member 48 and the floor panel 13.

(Second Rear Cross Member)

A second rear cross member 50 is provided at the vehicle rear side of the first rear cross member 48. The second rear cross member 50 is disposed at the vehicle lower side of the floor panel 13 with the vehicle transverse direction being the length direction thereof. The both end portions in the length direction of the second rear cross member 50 are joined by welding or the like to rear end portions 33 of the rear side member rear portions 22. As an example, the cross-sectional shape of the second rear cross member 50 that is cut along the vehicle longitudinal direction is shaped as a hat that opens toward the floor panel 13 side, and the second rear cross member 50 is joined by welding or the like to the lower surface of the floor panel 13. Due thereto, a closed cross-sectional structure is structured by the second rear cross member 50 and the floor panel 13. The pair of left and right rear side member rear portions 22 are connected in the vehicle transverse direction by this second rear cross member 50 and the above-described first rear cross member 48.

Note that a pair of rear floor side members 54, which are provided so as to extend in the vehicle longitudinal direction to the rear end of the vehicle body and on which are placed a rear floor panel 52 that structures the floor surface at the vehicle rear portion, are connected to the rear end portions 33 of the rear side member rear portions 22.

(Operation/Effects of First Embodiment)

In the present embodiment, as shown in FIG. 4, the vehicle body structure 10 has the rear side member rear portions 22, the rear side member front portions 20, and the projecting portions 40. The rear side member rear portions 22 are formed by die casting, are provided as a left/right pair at the vehicle transverse direction outer sides of the vehicle 12, and are provided so as to extend in the vehicle longitudinal direction. The rear side member front portions 20 are made of steel plates, are joined as a pair to the front end portions 30 of the rear side member rear portions 22 substantially from the vehicle transverse direction inner sides, and are provided so as to extend in the vehicle longitudinal direction. The projecting portions 40 are provided further toward the vehicle rear side than the positions (the joined portions 34) of the rear side member rear portions 22 where the rear side member front portions 20 are joined thereto, and project-out toward the vehicle cabin inner side with respect to the rear side member rear portions 22. Accordingly, at the time of a vehicle collision, and at the time of a rear collision or a collision with a pole in particular, there are cases in which the stress concentrates at the joined portions 34 of the first vehicle body frame members and the second vehicle body frame members, which are border portions of different members, and the joining comes undone. Namely, as an example, when collision load is inputted to the rear side member rear portion 22 and the rear side member front portion 20 at the time of a collision with a pole in which a pillar-shaped object P collides with a vehicle side surface at the vehicle front side of the rear tire, displacement of the rear side member rear portion 22 toward the vehicle transverse direction inner side is suppressed by the first rear cross member 48 and the second rear cross member 50. However, due to the rear side member front portion 20 being displaced toward the vehicle rear side (refer to the two-dot chain line in the drawing) with the vehicle transverse direction substantially central portion of the center cross member 46 being the so-called center of rotation, there are cases in which stress concentrates at the joined portion 34 of the rear side member rear portion 22 and the rear side member front portion 20, and the joining comes apart. In this case, the rear side member front portion 20 is displaced toward the vehicle transverse direction inner side with respect to the rear side member rear portion 22, and the rear side member front portion 20 starts to be displaced in a direction of approaching the rear side member rear portion 22 relatively. However, because the rear side member front portion 20 abuts the projecting portion 40 of the rear side member rear portion 22, further relative movement can be suppressed. Due thereto, deformation of the vehicle body 16 at the time of a vehicle collision can be suppressed.

Further, as shown in FIG. 3, the projecting portion 40 is formed substantially in the shape of a plate whose thickness direction is the substantially vehicle vertical direction, and the projecting portion 40 projects-out toward the vehicle transverse direction inner side. Therefore, the rear side member front portion 20 that, at the time of a vehicle collision, becomes disjoined and moves relatively in a direction of approaching the rear side member rear portion 22, abuts the front end surface 40A (see FIG. 4) of the projecting portion 40. Namely, because collision load is inputted to the projecting portion 40 in a direction in which it is difficult for the projecting portion 40 to bendingly deform, deformation of the projecting portion 40 is suppressed, and relative movement of the rear side member rear portion 22 can be suppressed more. Due thereto, further deformation of the vehicle body 16 at the time of a vehicle collision can be suppressed.

Moreover, the projecting portion 40 is provided with the thickness direction thereof being the substantially vehicle vertical direction, such that it is difficult for the projecting portion 40 to bendingly deform at the time when the rear side member front portion 20 abuts the projecting portion 40 at the front end portion 30 side of the rear side member rear portion 22. Therefore, relative movement of the rear side member front portion 20 at the time of a vehicle collision can be suppressed more by a minimum structure. Namely, deformation of the vehicle body 16 at the time of a vehicle collision can be suppressed while keeping in check an increase in the weight of and an increase in the cost of the vehicle body 16.

Second Embodiment

A vehicle body structure relating to a second embodiment of the present disclosure is described next by using FIG. 5 and FIG. 6. Note that structural portions that are the same as those of the above-described first embodiment and the like are denoted by the same numbers, and description thereof is omitted.

The basic structure of a vehicle body structure 70 relating to the second embodiment is similar to the first embodiment, and the vehicle body structure 70 has a feature in the point that a projecting portion 72 is provided so as to extend substantially horizontally toward the rear end portion 33 of the rear side member rear portion 22.

Figure 5:
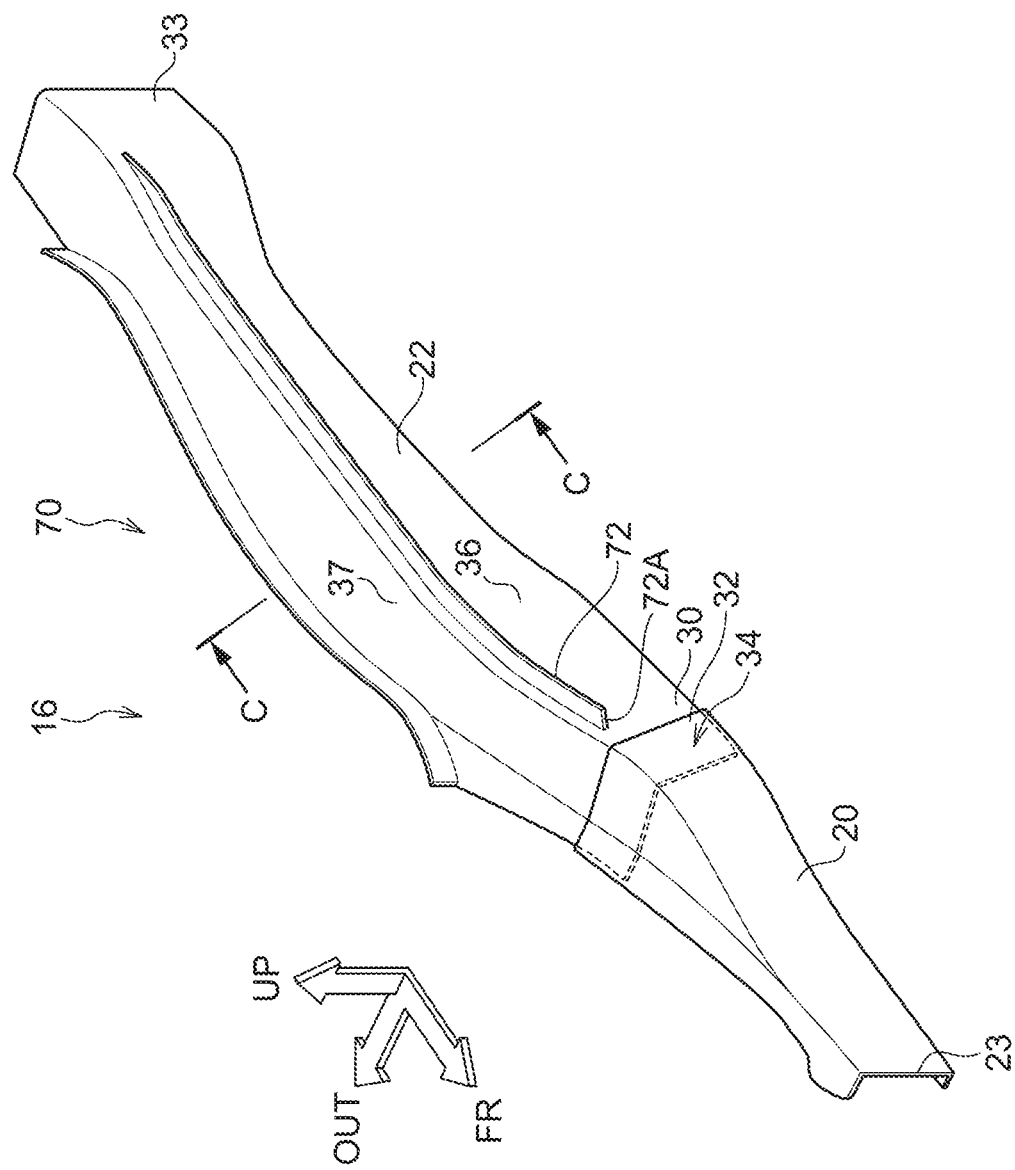
FIG. 5 is a schematic perspective view showing a state in which the first vehicle body frame member and the second vehicle body frame member in a vehicle body structure relating to a second embodiment are seen from the vehicle cabin inner side.
Figure 6:
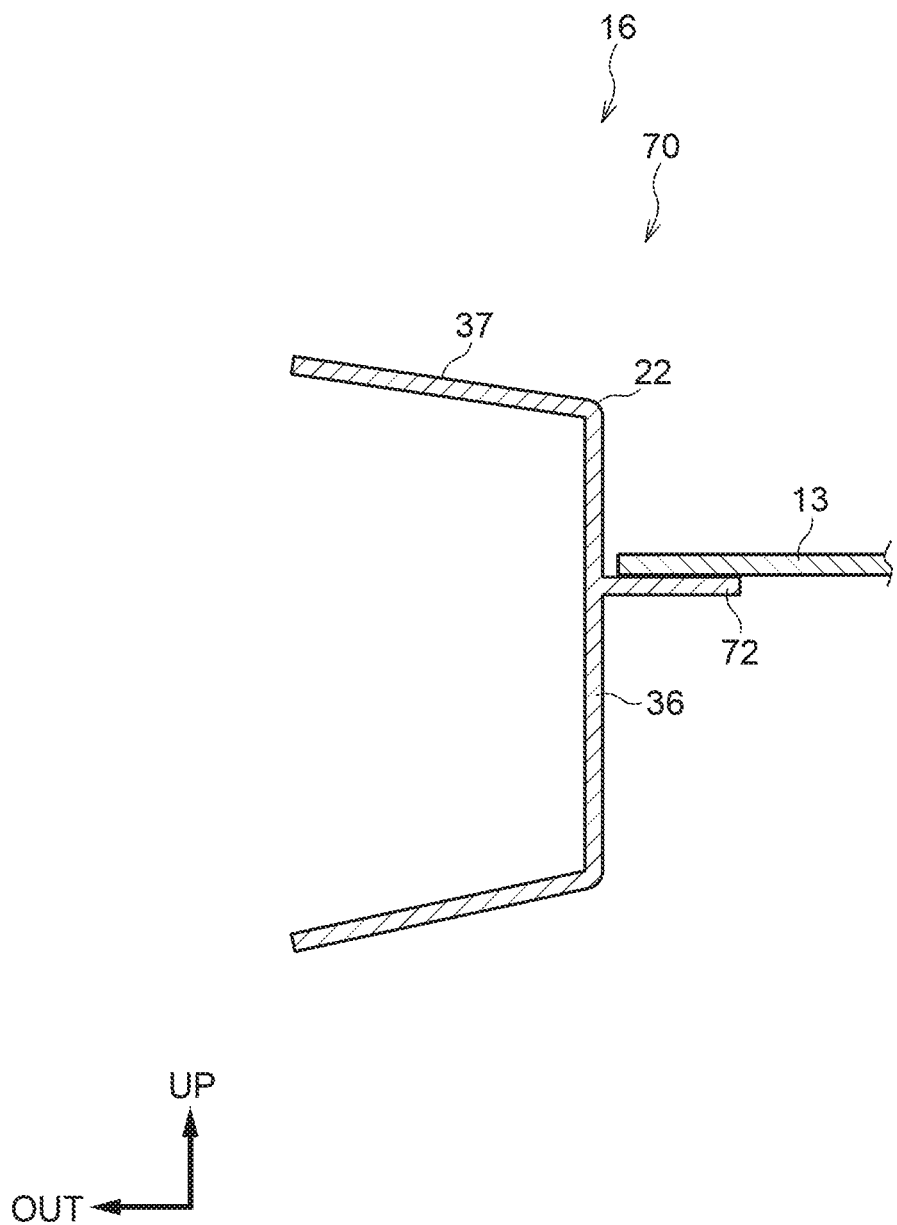
FIG. 6 is a cross-sectional view showing the state cut along line C-C in FIG. 5.

Namely, as shown in FIG. 5, the projecting portion 72 is provided further toward the vehicle rear side than the joined portion 34 at the rear side member rear portion 22. Concretely, the projecting portion 72 is provided from the front end portion 30 to the rear end portion 33 at the vehicle transverse direction inner side wall portion 36 of the rear side member rear portion 22. Further, the projecting portion 72 is formed substantially in the shape of a plate whose thickness direction is the substantially vehicle vertical direction and whose length direction is the substantially vehicle longitudinal direction. The projecting portion 72 projects-out toward the vehicle transverse direction inner side with respect to the vehicle transverse direction inner side wall portion 36. Namely, a front end surface 72A of the projecting portion 72 faces the rear end portion 32 of the rear side member front portion 20 in the vehicle longitudinal direction, and the projecting portion 72 is provided so as to extend substantially horizontally in the vehicle longitudinal direction. Note that, as shown in FIG. 6, the floor panel 13 is placed on the upper portion of the projecting portion 72. (The floor panel 13 is omitted in FIG. 5 in order to make it easy to see the projecting portion 72.)

(Operation/Effects of Second Embodiment)

Operation and effects of the second embodiment are described next.

In accordance with the above-described structure as well, effects that are similar to those of the first embodiment are obtained because the vehicle body structure 70 is structured similarly to the vehicle body structure 10 of the first embodiment other than the point that the projecting portion 72 is provided so as to extend substantially horizontally toward the rear end portion 33 of the rear side member rear portion 22. Further, because the projecting portion 72 is provided so as to extend substantially horizontally toward the rear end portion 33 of the rear side member rear portion 22, members, such as the floor panel 13 and the like that span between the pair of left and right rear side member rear portions 22, can be placed on the projecting portions. Namely, as shown in FIG. 7, generally, in a case in which a floor panel 100, which is provided between the pair of left and right rear side member rear portions 22, is joined to the rear side member rear portions 22, the floor panel 100 is joined respectively to the vehicle transverse direction inner side wall portions 36 and upper side wall portions 37 of the rear side member rear portions 22. Therefore, there is the need for a process that makes vehicle transverse direction both end portions 100A of the floor panel 100 match the shapes of the rear side member rear portions 22. However, in the present embodiment, as shown in FIG. 6, because the floor panel 13 can be placed on the projecting portions 72 from the vehicle upper side, the number of processes that the vehicle transverse direction both end portions of the floor panel 13 are subjected to can be reduced. Namely, the joining step at the time of providing the floor panel 13 and the like at the vehicle 12 is easy. Due thereto, the manufacturing efficiency can be improved.

Third Embodiment

A vehicle body structure relating to a third embodiment of the present disclosure is described next by using FIG. 8. Note that structural portions that are the same as those of the above-described first embodiment and the like are denoted by the same numbers, and description thereof is omitted.

The basic structure of a vehicle body structure 80 relating to the third embodiment is similar to the first embodiment, and the vehicle body structure 80 has a feature in the point that plural projecting portions 82 are provided so as to be apart from one another in the vehicle longitudinal direction.

Namely, as shown in FIG. 8, the projecting portions 82 are provided at the rear side member rear portion 22 at further toward the vehicle rear side than the joined portion 34. Concretely, the projecting portions 82 are provided so as to be apart from one another at the front end portion 30 side and the rear end portion 33 side, respectively, at the vehicle transverse direction inner side wall portion 36 of the rear side member rear portion 22. In other words, the plural (two in the present embodiment) projecting portions 82 are provided so as to be apart in the vehicle longitudinal direction. Further, each of the projecting portions 82 is formed substantially in the shape of a plate whose thickness direction is the substantially vehicle vertical direction and whose length direction is the substantially vehicle longitudinal direction. The projecting portions 82 are positioned in substantially the same plane in the horizontal direction, and project-out toward the vehicle transverse direction inner side with respect to the vehicle transverse direction inner side wall portion 36. Namely, a front end surface 82A of the projecting portion 82 that is at the front end portion 30 side of the rear side member rear portion 22 is structured so as to face the rear end portion 32 of the rear side member front portion 20 in the vehicle longitudinal direction. Further, although not illustrated, the floor panel 13 (see FIG. 6) is placed on the plural projecting portions 82, and members associated with the rear suspension member 44 (see FIG. 4) are disposed between the projecting portion 82 that is at the front end portion 30 side of the rear side member rear portion 22 and the projecting portion 82 that is at the rear end portion 33 side of the rear side member rear portion 22.

(Operation/Effects of Third Embodiment)

Operation and effects of the third embodiment are described next.

In accordance with the above-described structure as well, effects that are similar to those of the first embodiment are obtained because the vehicle body structure 80 is structured similarly to the vehicle body structure 10 of the first embodiment other than the point that the plural projecting portions 82 are provided so as to be apart in the vehicle longitudinal direction. Further, because the plural projecting portions 82 are provided so as to be apart in the vehicle longitudinal direction, and the respective projecting portions 82 are positioned in substantially the same plane in the horizontal direction, members, such as the floor panel 13 and the like that span between the pair of left and right rear side member rear portions 22, can be placed on the projecting portions 82. Further, because other members, such as members that are associated with the rear suspension member 44 (see FIG. 4) and the like, can be disposed between the projecting portions 82 that are apart from one another, the degrees of freedom in the layout of the parts increase. Due thereto, the degrees of freedom in design can be increased.

Note that, although the present embodiment is structured such that two of the projecting portions 82 are provided, the present disclosure is not limited to this, and may be structured such that three or more projecting portions are provided.

Fourth Embodiment

A vehicle body structure relating to a fourth embodiment of the present disclosure is described next by using FIG. 9. Note that structural portions that are the same as those of the above-described first embodiment and the like are denoted by the same numbers, and description thereof is omitted.

The basic structure of a vehicle body structure 90 relating to the fourth embodiment is similar to the first embodiment, and the vehicle body structure 90 has a feature in the point that a projecting portion 92 projects-out toward the vehicle transverse direction inner side with the substantially vehicle longitudinal direction being the plate thickness direction thereof.

Namely, as shown in FIG. 9, the projecting portion 92 is provided further toward the vehicle rear side than the joined portion 34 at the rear side member rear portion 22. Concretely, the projecting portion 92 is provided at the front end portion 30 at the vehicle transverse direction inner side wall portion 36 of the rear side member rear portion 22. The projecting portion 92 is formed substantially in the shape of a plate whose thickness direction is the substantially vehicle longitudinal direction and whose length direction is the substantially vehicle vertical direction. The projecting portion 92 projects-out toward the vehicle transverse direction inner side with respect to the vehicle transverse direction inner side wall portion 36. Namely, a vehicle front side wall surface 92A of the projecting portion 92 faces, in the vehicle longitudinal direction, the rear end portion 32 of the rear side member front portion 20.

(Operation/Effects of Fourth Embodiment)

Operation and effects of the fourth embodiment are described next.

In accordance with the above-described structure as well, effects that are similar to those of the first embodiment are obtained because the vehicle body structure 90 is structured similarly to the vehicle body structure 10 of the first embodiment other than the point that the projecting portion 92 projects out toward the vehicle transverse direction inner side with the substantially vehicle longitudinal direction being the plate thickness direction thereof. Further, because the projecting portion 92 is formed substantially in the shape of a plate whose thickness direction is the substantially vehicle longitudinal direction, the rear side member front portion 20, which, at the time of a vehicle collision, becomes disjoined and moves relatively in a direction of approaching the rear side member rear portion 22, abuts the vehicle front side wall surface 92A of the projecting portion 92. Namely, the surface area of abutment at the time when the rear side member front portion 20 abuts the projecting portion 92 can be made to be relatively large as compared with a case in which the rear side member front portion 20 abuts an end surface of the projecting portion 92, and therefore, the collision load can be dispersed efficiently. Due thereto, deformation of the vehicle body 16 at the time of a vehicle collision can be suppressed more.

Fifth Embodiment

A vehicle body structure relating to a fifth embodiment of the present disclosure is described next by using FIG. 10. Note that structural portions that are the same as those of the above-described first and fourth embodiments and the like are denoted by the same numbers, and description thereof is omitted.

The basic structure of a vehicle body structure 96 relating to the fifth embodiment is similar to the first and fourth embodiments. The vehicle body structure 96 has a feature in the point that a first projecting portion 98A, which projects-out toward the vehicle transverse direction inner side with the substantially vehicle longitudinal direction being the plate thickness direction thereof, and a second projecting portion 98B, which projects-out toward the vehicle transverse direction inner side at a vehicle rear side wall surface 98AA of the first projecting portion 98A with the substantially vehicle vertical direction being the plate thickness direction thereof, are joined together.

Namely, as shown in FIG. 10, the first projecting portion 98A and the second projecting portion 98B are provided further toward the vehicle rear side than the joined portion 34 at the rear side member rear portion 22. The first projecting portion 98A is provided at the front end portion 30 at the vehicle transverse direction inner side wall portion 36 of the rear side member rear portion 22. Further, the first projecting portion 98A is formed substantially in the shape of a plate whose thickness direction is the substantially vehicle longitudinal direction and whose length direction is the substantially vehicle vertical direction. The first projecting portion 98A projects-out toward the vehicle transverse direction inner side with respect to the vehicle transverse direction inner side wall portion 36. Namely, a vehicle front side wall surface 98AB of the first projecting portion 98A is structured so as to face, in the vehicle longitudinal direction, the rear end portion 32 of the rear side member front portion 20.

The second projecting portion 98B is provided at the front end portion 30 of the vehicle transverse direction inner side wall portion 36 of the rear side member rear portion 22, and is joined to the vehicle upper end portion of the vehicle rear side wall surface 98AA of the first projecting portion 98A. Further, the second projecting portion 98B is formed substantially in the shape of a plate whose thickness direction is the substantially vehicle vertical direction and whose length direction is the substantially vehicle longitudinal direction. The second projecting portion 98B projects-out toward the vehicle transverse direction inner side with respect to the vehicle transverse direction inner side wall portion 36. Namely, as seen in a vehicle side view, the projecting portion 98 is formed in a substantial L-shape by the first projecting portion 98A that is provided so as to extend substantially in the vehicle vertical direction and the second projecting portion 98B that is provided so as to extend substantially in the vehicle longitudinal direction.

(Operation/Effects of Fifth Embodiment)

Operation and effects of the fifth embodiment are described next.

In accordance with the above-described structure as well, effects that are similar to those of the first and fourth embodiments are obtained because the vehicle body structure 96 is structured similarly to the vehicle body structure 10 of the first embodiment other than the point that, at the projecting portion 98, the first projecting portion 98A, which projects-out toward the vehicle transverse direction inner side with the substantially vehicle longitudinal direction being the plate thickness direction thereof, and the second projecting portion 98B, which projects-out toward the vehicle transverse direction inner side at the vehicle rear side wall surface 98AA of the first projecting portion 98A with the substantially vehicle vertical direction being the plate thickness direction thereof, are joined together. Further, the projecting portion 98 is a structure in which the second projecting portion 98B is joined to the vehicle rear side wall surface 98AA of the first projecting portion 98A. The second projecting portion 98B is formed substantially in the shape of a plate whose thickness direction is the substantially vehicle vertical direction. Accordingly, the surface area of abutment of the rear side member front portion 20, which, at the time of a vehicle collision, becomes disjoined and moves relatively in a direction of approaching the rear side member rear portion 22, for abutting the vehicle front side wall surface 98AB of the first projecting portion 98A can be made to be relatively large. Therefore, the collision load can be dispersed efficiently. Further, the collision load that is inputted to the first projecting portion 98A can be transmitted to the second projecting portion 98B that is joined to the vehicle rear side wall surface 98AA. At the second projecting portion 98B, because collision load is inputted in a direction in which it is difficult for the second projecting portion 98B to bendingly deform, the collision load can be absorbed more efficiently. Due thereto, deformation of the vehicle body 16 at the time of a vehicle collision can be suppressed even more.

Note that the above-described embodiment is structured such that the second projecting portion 98B is provided at the front end portion 30 at the vehicle transverse direction inner side wall portion 36 of the rear side member rear portion 22, but the present disclosure is not limited to this. As shown by the two-dot chain line, there may be a structure in which the second projecting portion is provided so as to extend substantially horizontally toward the rear end portion 33 of the rear side member rear portion 22, or there may be a structure in which a plurality of the second projecting portions are provided so as to be apart from one another in the vehicle longitudinal direction.

Further, although the second projecting portion 98B is joined to the vehicle upper end portion at the vehicle rear side wall surface 98AA of the first projecting portion 98A, the present disclosure is not limited to this. There may be a structure in which the second projecting portion is joined to another region, such as the vehicle lower end portion or the like, at the vehicle rear side wall surface 98AA.

Moreover, the projecting portions 40, 72, 82, 92, 98 are structured so as to be provided at the vehicle transverse direction inner side wall portion 36 of the rear side member rear portion 22. However, the present disclosure is not limited to this, and there may be a structure in which the projecting portion(s) are provided at another region, such as at the upper side wall portion 37 or the like.

The present disclosure is not limited to the above-described examples and can, of course, be implemented by being modified in various ways, other than the above-described examples, within a scope that does not depart from the gist thereof.

What is claimed is:

1. A vehicle body structure, comprising:
   a pair of left and right first vehicle body rearward rear frame members that are manufactured by die casting, that are provided at vehicle transverse direction outer sides of a vehicle, and that extend in a vehicle longitudinal direction;
   a pair of left and right second vehicle body forward rear frame members that are made of steel plates, that are joined to front end portions of the first vehicle body rearward rear frame members from substantially vehicle transverse direction inner sides, and that extend in the vehicle longitudinal direction; and
   projecting portions that are provided at the first vehicle body rearward rear frame members further toward a vehicle rear side than positions at which the second vehicle body forward rear frame members are joined to the first vehicle body rearward rear frame members, and that project toward a vehicle cabin inner side with respect to the first vehicle body rearward rear frame members.

2. The vehicle body structure of claim 1, wherein the projecting portions are respectively formed substantially in a shape of a plate having a thickness direction substantially in a vehicle vertical direction.

3. The vehicle body structure of claim 2, wherein the projecting portions extend substantially in a horizontal direction toward rear end portions of the first vehicle body rearward rear frame members.

4. The vehicle body structure of claim 2, wherein a plurality of the projecting portions separated from one another in the vehicle longitudinal direction, and the respective projecting portions are positioned substantially in the same plane as each other in a horizontal direction.

5. The vehicle body structure of claim 1, wherein the projecting portions are respectively formed substantially in a shape of a plate having a thickness direction substantially in the vehicle longitudinal direction.

6. The vehicle body structure of claim 1, wherein:
   the projecting portions comprise first projecting portions and second projecting portions,
   the first projecting portions are respectively formed substantially in a shape of a plate having a thickness direction substantially in the vehicle longitudinal direction,
   the second projecting portions are respectively formed substantially in a shape of a plate having a thickness direction substantially in a vehicle vertical direction, and
   the second projecting portions are joined to vehicle rear side wall surfaces of the first projecting portions.

7. A vehicle body structure, comprising:
   a pair of left and right first vehicle body frame members that are manufactured by die casting, that are provided at vehicle transverse direction outer sides of a vehicle, and that extend in a vehicle longitudinal direction;
   a pair of left and right second vehicle body frame members that are made of steel plates, that are joined to front end portions of the first vehicle body frame members from substantially vehicle transverse direction inner sides, and that extend in the vehicle longitudinal direction; and
   projecting portions that are provided at the first vehicle body frame members further toward a vehicle rear side than positions at which the second vehicle body frame members are joined to the first vehicle body frame members, the projecting portions project toward a vehicle cabin inner side with respect to the first vehicle body frame members, and the projecting portions are respectively formed substantially in a shape of a plate having a thickness direction substantially in the vehicle longitudinal direction.

8. A vehicle body structure, comprising:
   a pair of left and right first vehicle body frame members that are manufactured by die casting, that are provided at vehicle transverse direction outer sides of a vehicle, and that extend in a vehicle longitudinal direction;
   a pair of left and right second vehicle body frame members that are made of steel plates, that are joined to front end portions of the first vehicle body frame members from substantially vehicle transverse direction inner sides, and that extend in the vehicle longitudinal direction; and
   projecting portions that are provided at the first vehicle body frame members further toward a vehicle rear side than positions at which the second vehicle body frame members are joined to the first vehicle body frame members, the projecting portions project toward a vehicle cabin inner side with respect to the first vehicle body frame members, and the projecting portions comprise first projecting portions and second projecting portions, wherein:

the first projecting portions are respectively formed substantially in a shape of a plate having a thickness direction substantially in the vehicle longitudinal direction, the second projecting portions are respectively formed substantially in a shape of a plate having a thickness direction substantially in a vehicle vertical direction, and the second projecting portions are joined to vehicle rear side wall surfaces of the first projecting portions.

* * * * *